Patented Nov. 1, 1932

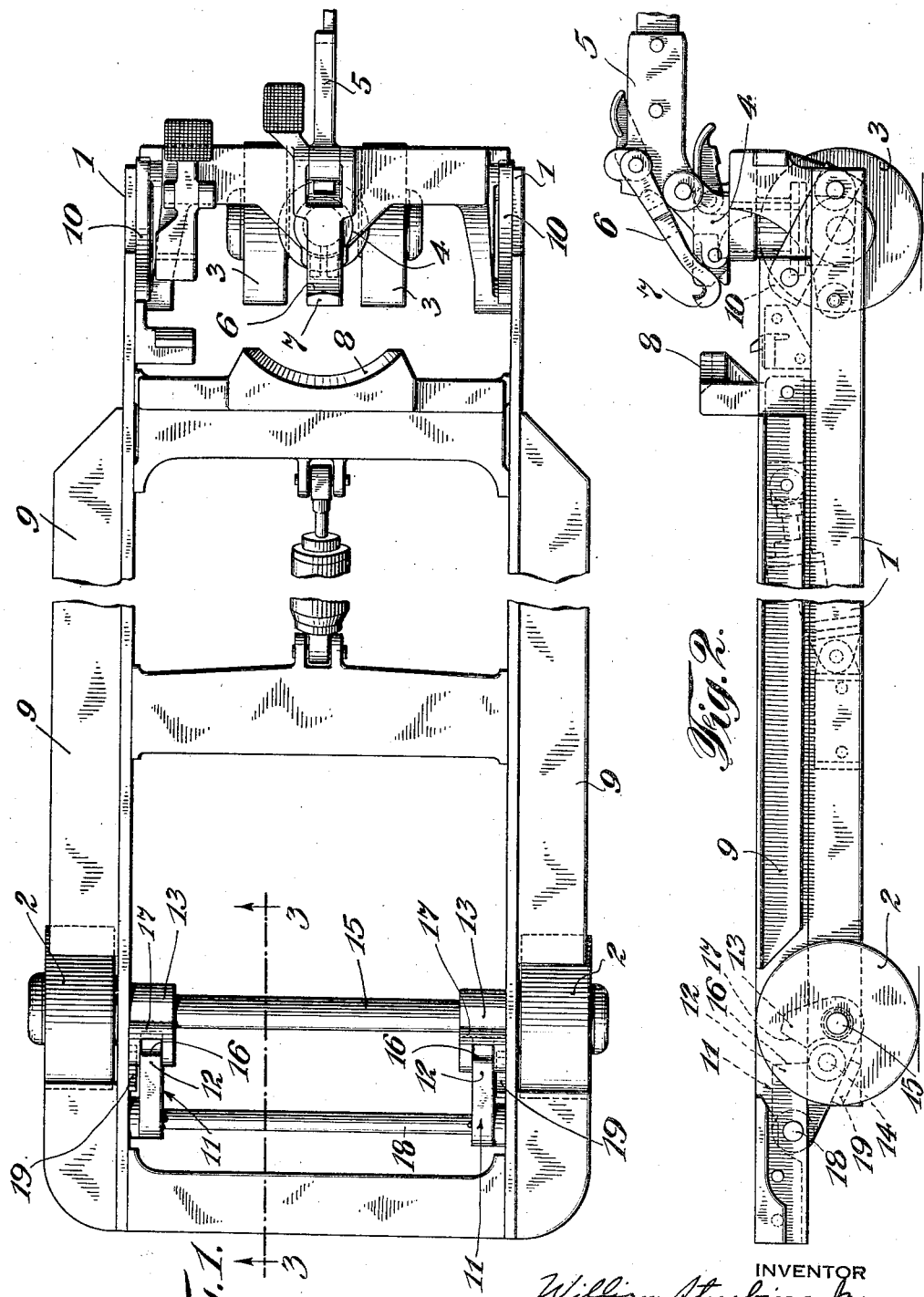

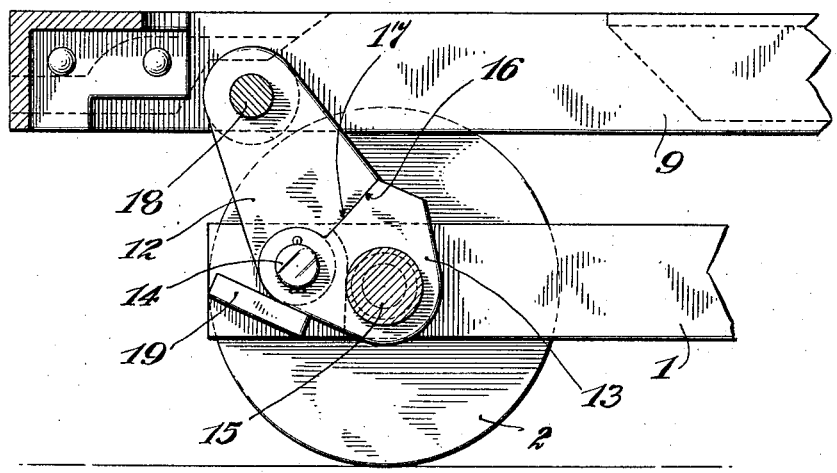
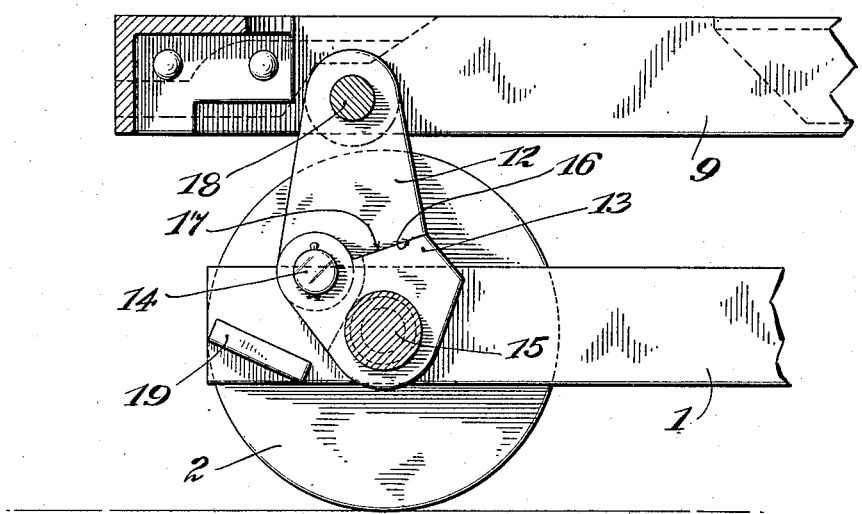

1,885,649

UNITED STATES PATENT OFFICE

WILLIAM STUEBING, JR., OF CINCINNATI, OHIO, ASSIGNOR, BY MESNE ASSIGNMENTS, TO THE YALE & TOWNE MANUFACTURING COMPANY, OF STAMFORD, CONNECTICUT, A CORPORATION OF CONNECTICUT

LIFTING TRUCK

Application filed November 15, 1928. Serial No. 319,692.

This invention relates to lifting trucks and has as an object to provide a connection between the main frame and elevating frame of the truck which shall facilitate easy lifting operation.

Other objects and advantages of the invention will appear hereinafter.

A preferred embodiment of the invention selected for purposes of illustration is shown in the accompanying drawings, in which, Figure 1 is a top plan view of a truck embodying the invention.

Figure 2 is a side elevation.

Figure 3 is an enlarged section on the line 3—3 of Figure 1 showing the elevating frame in an intermediate position, and Figure 4 is a similar view showing the elevating frame in its completely elevated position.

Referring to the drawings, the truck illustrated comprises a main frame 1 supported at its rear end by wheels 2 and at its front end by wheels 3. The wheels 3 are steering wheels and are connected to a swivelled steering head 4, upon which is pivotally mounted the steering tongue 5.

Any suitable lifting mechanism may be employed, that shown herein for purposes of illustration comprising a lifting member 6 which is pivotally connected to the steering tongue 5, the said member 6 being provided with an up-turned hook 7 which is adapted to engage the under side of the arcuate member 8, so that when the members 7 and 8 are brought into engagement, downward movement of the steering tongue 5 in a vertical plane may cause the elevating frame 9 to move forwardly and upwardly with respect to the main frame.

The elevating frame 9 is pivotally connected to the main frame 1 by means of a pair of links 10 at the forward end of the truck, and by means of a pair of links 11 at the rear end of the truck. The links 10 may be of the ordinary rigid variety commonly used in lifting trucks, but the links 11 are preferably compound links, each comprising the member 12 and the member 13, the said members being pivotally connected together at 14.

The members 12 and 13 are permitted to have only a limited degree of pivotal motion with respect to one another, in order as the elevating frame is swung forwardly and upwardly by the lifting mechanism, pivotal motion may take place first about the pivot 14, and subsequently about the pivot 15. For this purpose the members 12 and 13 are formed to provide spaced abutting surfaces 16 and 17 which are arranged to engage one another when the lifting movement of the elevating frame is partially completed. Thus during the first part of the upward movement of the elevating frame, pivotal motion takes place about the pivot 14 until the faces 16 and 17 come into engagement, whereupon pivotal motion takes place about the pivot 15. In this manner, as will be observed, the lever arm through which the lifting force is applied is varied as the elevating frame is raised, being increased from the distance between the pivot 14 and the pivot 18 at the start of lifting movement to the distance from pivot 15 to pivot 18 during the latter portion of the lifting operation.

Thus at the beginning of the lifting operation, when the lifting tongue is in a substantially vertical position which is unfavorable for efficient application of the weight of the operator, lifting movement is relatively easy because of the shorter lever arm, but as lifting movement progresses and the tongue comes to a position where the operator can use his weight, the lever arm is lengthened.

Stops 19 are preferably secured to the rear end of the main frame in position to limit the motion of the members 13 with respect to said frame. As illustrated in Figures 2 and 3, the members 13 rest against the stops when the elevating frame is in lowered position and continue to rest against the stop as the elevating frame rises until the faces 16 and 17 come into engagement. Also as the elevating frame is lowered, from the position shown in Figure 4, the member 13 pivots about the pivot 15 until the stop 19 is engaged whereupon the member 12 pivots about the pivot 14.

As will be understood, the links 10 at the forward end of the truck may be replaced by compound links such as the links 11, if desired.

It will be understood that the invention may be variously modified and embodied within the scope of the subjoined claims.

I claim as my invention:

1. A lifting truck comprising, in combination, a main frame, an elevating frame, a member pivotally mounted on said main frame, and a member pivotally mounted on said elevating frame, said pivotally mounted members being pivotally connected to each other and having interengaging portions for limiting the pivotal movement of said members with respect to one another during lifting movement of said elevating frame, said members being movable together during that portion of the lifting movement of said elevating frame that said portions are engaged.

2. A lifting truck comprising, in combination, a main frame, an elevating frame, a member pivotally mounted on said main frame, a member pivotally mounted on said elevating frame, said pivotally mounted members being pivotally connected to each other and having interengaging portions for limiting their relative angular movement, and means for engaging said first named member to limit movement thereof with respect to said main frame.

3. A lifting truck comprising in combination, frame supporting wheels, an elevating frame, a link interposed between said wheels and said elevating frame, said link comprising pivotally connected separate portions, one of said portions being mounted to limit angular movement of the other portion during lifting movement of the elevating frame, and a stop member positioned to limit angular movement of the link during movement of the frame toward its lowered position.

4. A lifting truck comprising, in combination, frame supporting wheels, an elevating platform, a link interposed between said wheels and elevating platform, said link comprising pivotally connected separate portions, one of said portions being pivoted to the elevating platform, means on said frame limiting downward movement of said link portions relatively thereto, and means between said link portions limiting their relative pivotal movement during upward movement of the elevating platform.

In testimony whereof, I have signed my name to this specification this 12th day of November, 1928.

WILLIAM STUEBING, JR.